(12) United States Patent
Yang et al.

(10) Patent No.: US 9,858,025 B2
(45) Date of Patent: Jan. 2, 2018

(54) METHOD FOR CONTROLLING COMBINED DISPLAY AND ELECTRONIC DEVICE THEREOF

(71) Applicant: Samsung Electronics Co., Ltd., Gyeonggi-do (KR)

(72) Inventors: Woong-Seok Yang, Gyeongsangbuk-do (KR); Jin-Wan An, Gyeongsangbuk-do (KR); Chul-Hyung Yang, Gyeongsangbuk-do (KR); Yong-Gil Han, Gyeongsangbuk-do (KR); Sung-Jun Kim, Daegu (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 59 days.

(21) Appl. No.: 14/324,032

(22) Filed: Jul. 3, 2014

(65) Prior Publication Data
US 2015/0009097 A1  Jan. 8, 2015

(30) Foreign Application Priority Data
Jul. 3, 2013 (KR) .......... 10-2013-0077885

(51) Int. Cl.
*G06F 3/14* (2006.01)

(52) U.S. Cl.
CPC ... *G06F 3/1438* (2013.01); *G09G 2320/0693* (2013.01)

(58) Field of Classification Search
None
See application file for complete search history.

(56) References Cited

U.S. PATENT DOCUMENTS

| | | | |
|---|---|---|---|
| 2008/0216125 A1 | 9/2008 | Li et al. | |
| 2013/0072116 A1* | 3/2013 | Song | H04B 7/26 455/41.1 |
| 2013/0111369 A1* | 5/2013 | Pasquero | G06F 3/0481 715/761 |
| 2013/0225078 A1* | 8/2013 | Johansson | H04W 76/02 455/41.2 |
| 2014/0013100 A1* | 1/2014 | Menzel | H04N 21/43637 713/150 |
| 2014/0359498 A1* | 12/2014 | Eriksson | G06F 3/0481 715/765 |

* cited by examiner

Primary Examiner — Bryan Earles (57) ABSTRACT

A method for controlling a combined display in an electronic device includes: performing connection to at least one sub-electronic device; receiving an image from the at least one sub-electronic device; and identifying relative position information of the at least one sub-electronic device with respect to the electronic device by using the image; and configuring the combined display in cooperation with the at least one sub-electronic device by using the relative position information.

12 Claims, 11 Drawing Sheets

METHOD FOR CONTROLLING COMBINED DISPLAY AND ELECTRONIC DEVICE THEREOF

CROSS REFERENCE TO RELATED APPLICATIONS AND CLAIM OF PRIORITY

The present application is related to and claims priority under 35 U.S.C. §119 to an application filed in the Korean Intellectual Property Office on Jul. 3, 2013 and assigned Serial No. 10-2013-0077885, the contents of which are incorporated herein by reference.

TECHNICAL FIELD

The present disclosure relates to a technology of configuring a combined display method and an electronic device thereof.

BACKGROUND

Portable terminals have become necessary articles of modern persons due to their portability, and have evolved into multimedia devices that provide various services, such as voice and video call functions, information input/output functions, and data transmission/reception functions.

As described above, as the electronic device provides a multimedia service, the amount of information to be processed by the electronic device and the amount of information to be displayed have increased. As a result, there is a growing interest in an electronic device having a touchscreen in which the space of the electronic device is efficiently used and the size of the display unit of the electronic device is increased. There is a tendency of reducing the size of a bezel in a touchscreen in order to increase the size of the display unit. Recently, a technology of enabling the display unit to have no bezel has been developed, and the display unit employing that technology is about to be manufactured.

SUMMARY

To address the above-discussed deficiencies, embodiments of the present disclosure provide an apparatus and method for configuring a combined display in cooperation with at least one sub-electronic device in an electronic device.

Embodiments of the present disclosure provide an apparatus and method for configuring a combined display in cooperation with at least one sub-electronic device through near field wireless communication in an electronic device.

Embodiments of the present disclosure provide an apparatus and method for setting relative position information of at least one sub-electronic device with respect to an electronic device by comparing of images acquired through cameras of the respective electronic devices.

Embodiments of the present disclosure provide a method for controlling a combined display in an electronic device. The method includes: connecting to at least one sub-electronic device; receiving an image from the at least one sub-electronic device; identifying relative position information of the at least one sub-electronic device with respect to the electronic device by using the image; and configuring the combined display in cooperation with the at least one sub-electronic device by using the relative position information.

Embodiments of the present disclosure provide an electronic device that includes: at least one processor; at least one memory; and at least one program stored in the memory and configured to be executable by the processor. The processor: connects to at least one sub-electronic device; receives an image from the at least one sub-electronic device; identifies relative position information of the at least one sub-electronic device with respect to the electronic device by using the image; and configures the combined display in cooperation with the at least one sub-electronic device by using the relative position information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6F, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Embodiments of the present disclosure will be described herein below with reference to the accompanying drawings. In the following description, detailed descriptions of well-known functions or configurations will be omitted since they would unnecessarily obscure the subject matters of the present disclosure. Also, the terms used herein are defined according to the functions of the present disclosure. Thus, the terms may vary depending on users' or operators' intentions or practices. Therefore, the terms used herein are to be understood based on the descriptions made herein.

The present disclosure provides a technology of configuring a combined display in cooperation with a sub-electronic device by using a camera in an electronic device.

In the following description, examples of the electronic device include a mobile communication terminal, a personal digital assistant (PDA), a laptop computer, a smart phone, a netbook, a television, a mobile internet device (MID), an ultra mobile personal computer (UMPC), a tablet PC, a navigation device, a digital refrigerator, a digital watch, and an MP3 player.

Figure 1:
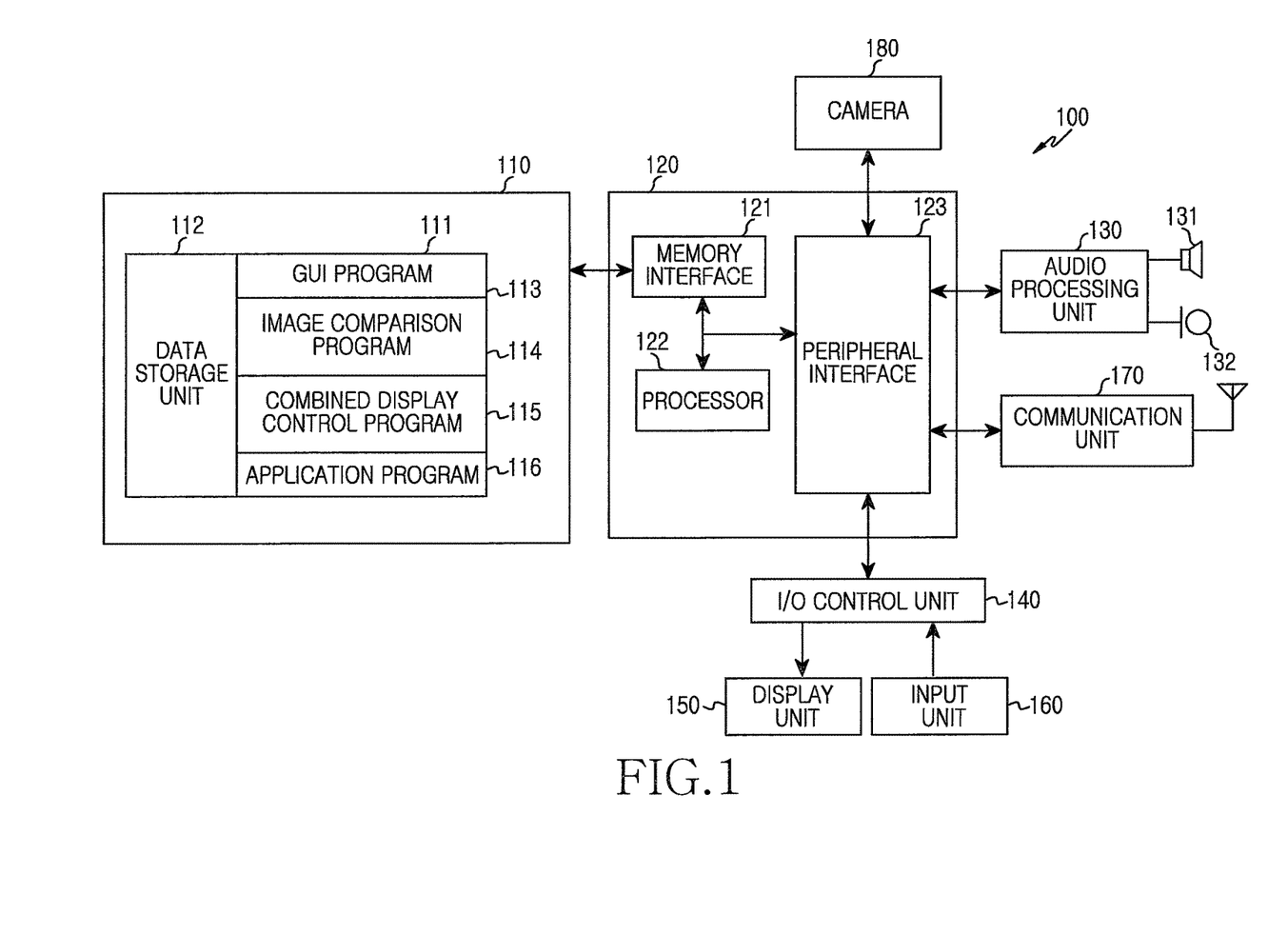
FIG. 1 illustrates a block configuration of an electronic device according to various embodiments of the present disclosure.

FIG. 1 illustrates a block configuration of an electronic device according to various embodiments of the present disclosure.

Referring to FIG. 1, the electronic device 100 includes a memory 110, a processor unit 120, an audio processing unit 130, an input/output control unit 140, a display unit 150, an input unit 160, and a communication unit 170. Herein, the memory 110 can be provided in plurality.

The respective components will be described below.

The memory 110 includes a program storage unit 111 for storing a program for controlling an operation of the electronic device 100, and a data storage unit 112 for storing data generated during the execution of a program.

The program storage unit 111 includes a Graphic User Interface (GUI) program 113, an image comparison program 114, a combined display control program 115, and at least one application program 116. Herein, the programs stored in the program storage unit 111 can be expressed as an instruction set that is a collection of instructions.

The data storage unit 112 stores an image captured by a camera of the electronic device. In addition, the data storage unit 112 stores an image received from a sub-electronic device. The data storage unit 112 stores display information of the sub-electronic device which is transmitted from the sub-electronic device. Herein, the display information includes a resolution (dots per inch (DPI) and pixels per inch (PPI)).

The GUI program 113 includes at least one software component for providing a graphic user interface on the display unit 150. For example, the GUI program 113 controls to display information about an application program executed by the processor 122 on the display unit 150. As another example, the GUI program 113 enables the combined display control program 115 to display a menu for setting a position of the electronic device for combined display configuration on the display unit 150.

Figure 6A:
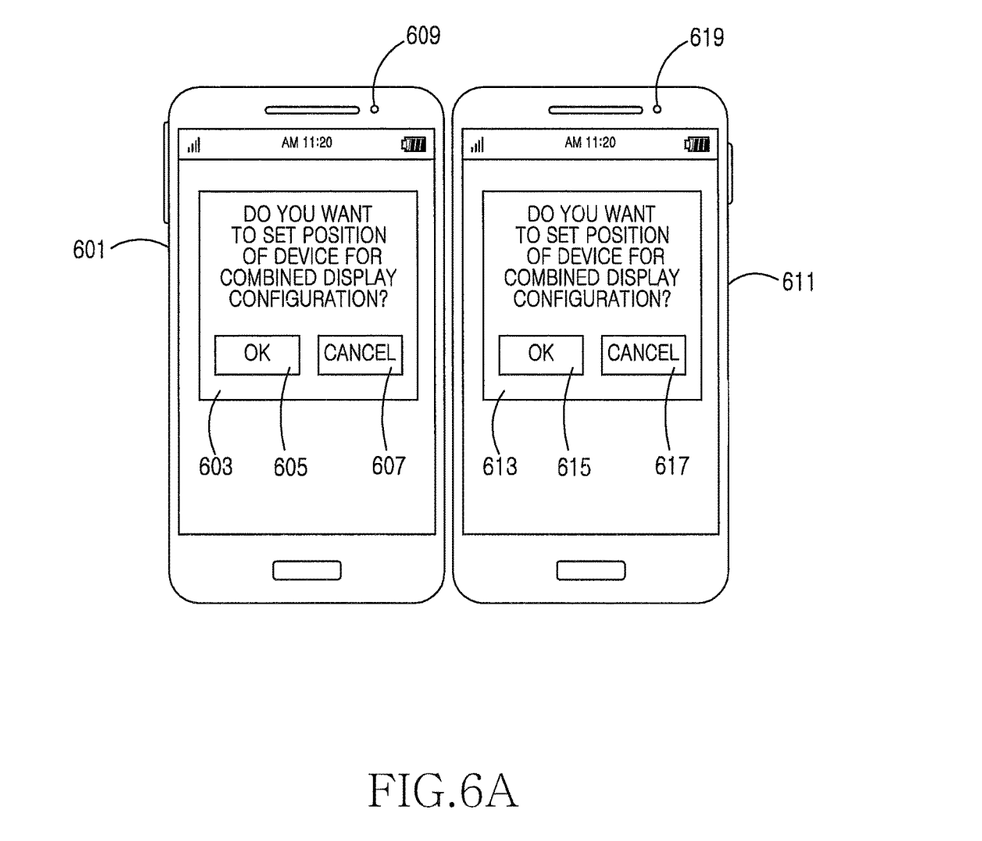
FIGS. 6A to 6F illustrate screen configurations for configuring a combined display in cooperation with a sub-electronic device in an electronic device according to various embodiments of the present disclosure.
Figure 6B:
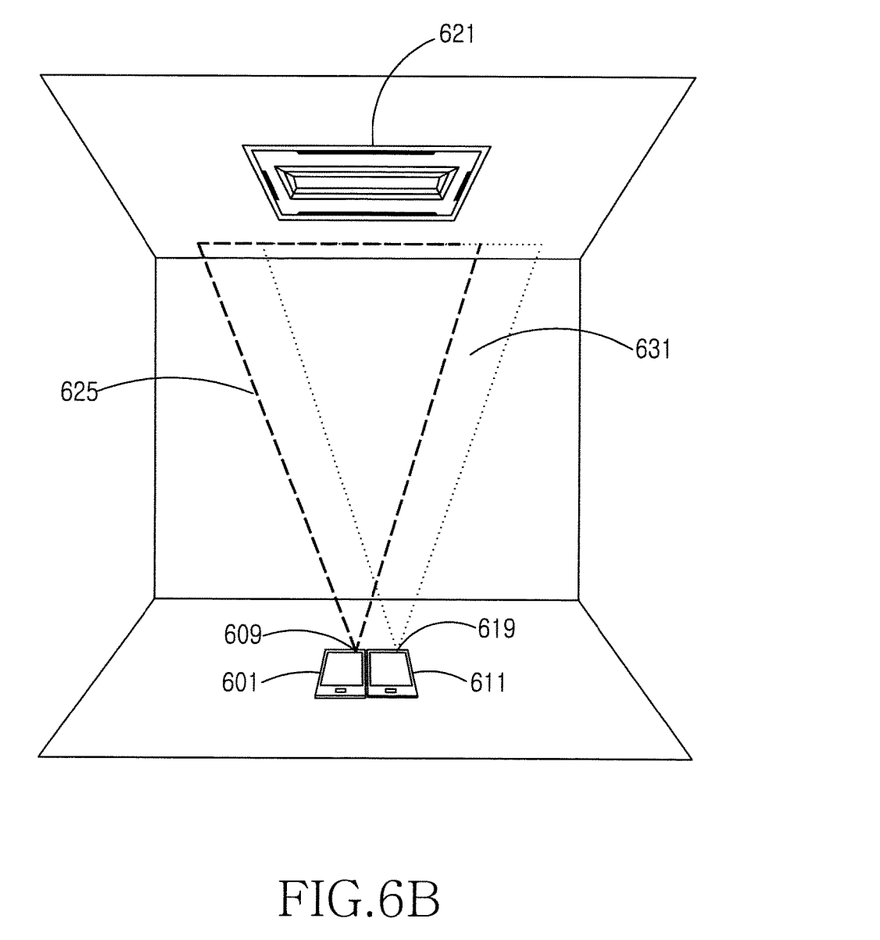
Figure 6C:
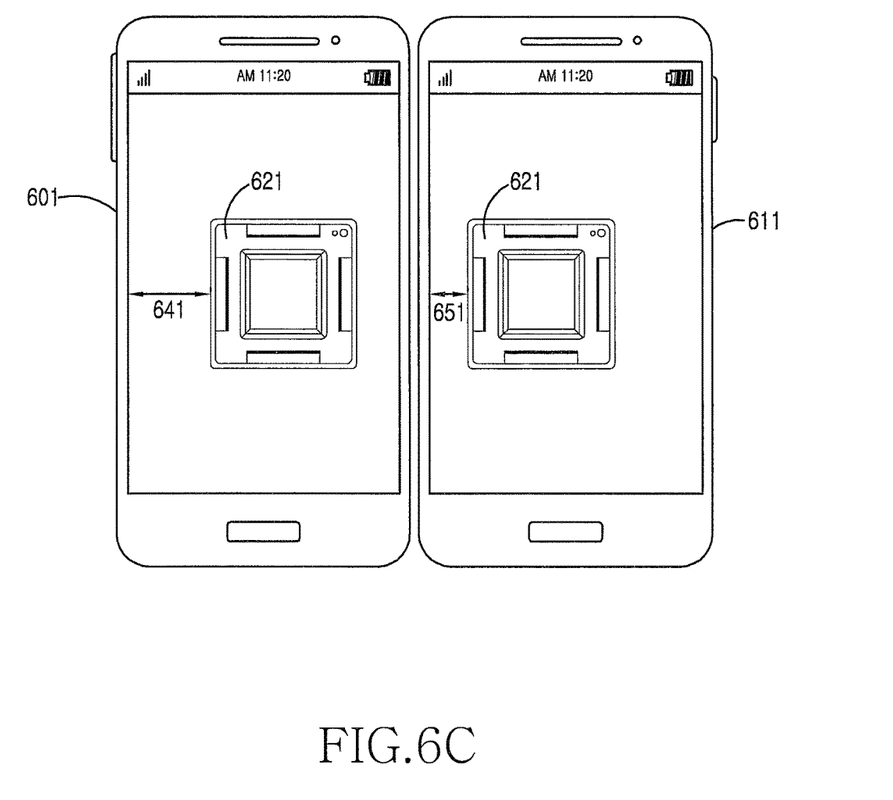
Figure 6D:
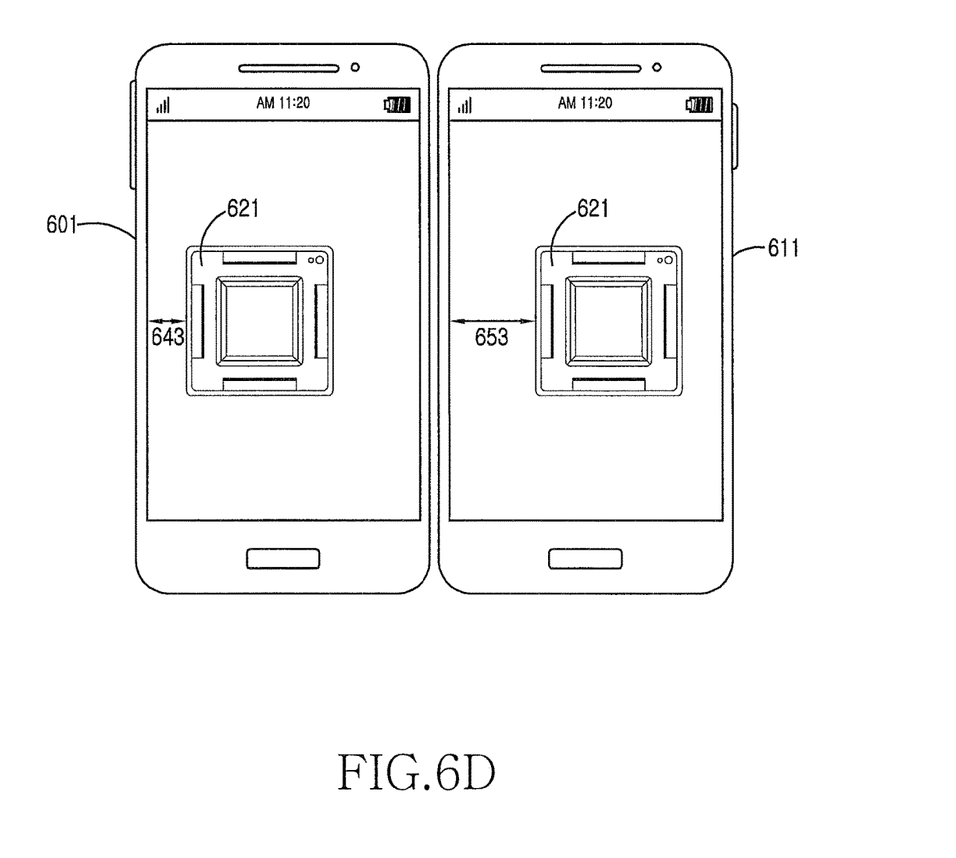

The image comparison program 114 includes at least one software component for comparing an image on the electronic device with an image on the sub-electronic device. For example, the image comparison program 114 identifies whether the sub-electronic device is located at the upper, lower, left or right side of the electronic device through image comparison. For example, the image comparison program 114 identifies the relative position information of the sub-electronic device 611 with respect to the electronic device 601 by comparing a left space 641 of a subject 621 in an image 625 acquired by the electronic device 601 with a left space 651 of the subject 621 in an image received from the sub-electronic device 611 as illustrated in FIG. 6C. For example, the image comparison program 114 identifies that the sub-electronic device 611 is located on the right side of the electronic device 601 through the image comparison. In this case, FIG. 6D illustrates a case where an image acquired by a camera in the electronic device 601 and an image acquired by a camera in the sub-electronic device 611 are reversed left to right.

The combined display control program 115 includes at least one software component for controlling to configure the combined display between the electronic device and the sub-electronic device. For example, the combined display control program 115 determines whether a menu for configuring a combined display in cooperation with at least one sub-electronic device connected to the electronic device through near wireless communication is selected. In this case, the combined display control program 115 select at least one sub-electronic device for combined display configuration. When an event for combined display configuration occurs, the combined display control program 115 determines whether to set a position for combined display configuration as illustrated by reference element 603 in FIG. 6A. When the position for combined display configuration is set as illustrated by the OK button 605, the combined display control program 115 acquires an image 625 by driving the camera 609 of the electronic device 601 to capture a subject 621 as illustrated in FIG. 6B. At the same time, the combined display control program 115 request the sub-electronic device 611 to transmit an image. For example, the combined display control program 115 requests the sub-electronic device 611 to determine whether to set a position for combined display configuration as illustrated by reference element 613 in FIG. 6A. When the position for combined display configuration is set, the combined display control program 115 requests the sub-electronic device 611 to transmit an image 631 acquired by capturing the subject 621 through the camera 619 of the sub-electronic device 611. In this case, the combined display control program 115 controls to capture an image at the same time as the time of the capturing by the sub-electronic device 611 by using a timer. In this case, the combined display control program 115 requests the sub-electronic device 611 to transmit an image captured at the same time as the time of the capturing by the electronic device 611. For example, the combined display control program 115 identifies whether the sub-electronic device is located on the upper, lower, left or right side of the electronic device through image comparison by the image comparison program 114. Thereafter, the combined display control program 115 controls to transmit display data to the sub-electronic device by using the relative position information. In this case, a near field wireless communication interface through which the electronic device transmits display data to the sub-electronic device can be identical to or different from a near field wireless communication interface through which the electronic device is connected to the sub-electronic device.

The application program 116 includes a software component for at least one application program installed in the electronic device 100.

The processor unit 120 includes a memory interface 121, at least one processor 122, and a peripheral interface 123. Herein, the memory interface 121, the at least one processor 122, and the peripheral interface 123 which are included in the processor unit 120 can be integrated into at least one integrated circuit or be implemented as separate components.

The memory interface 121 controls access to the memory 100 of components, such as the processor 122 or the peripheral interface 123.

The peripheral interface 123 controls connections of the input/output peripherals of the electronic device 100 to the processor 122 and the memory interface 121.

Figure 2:
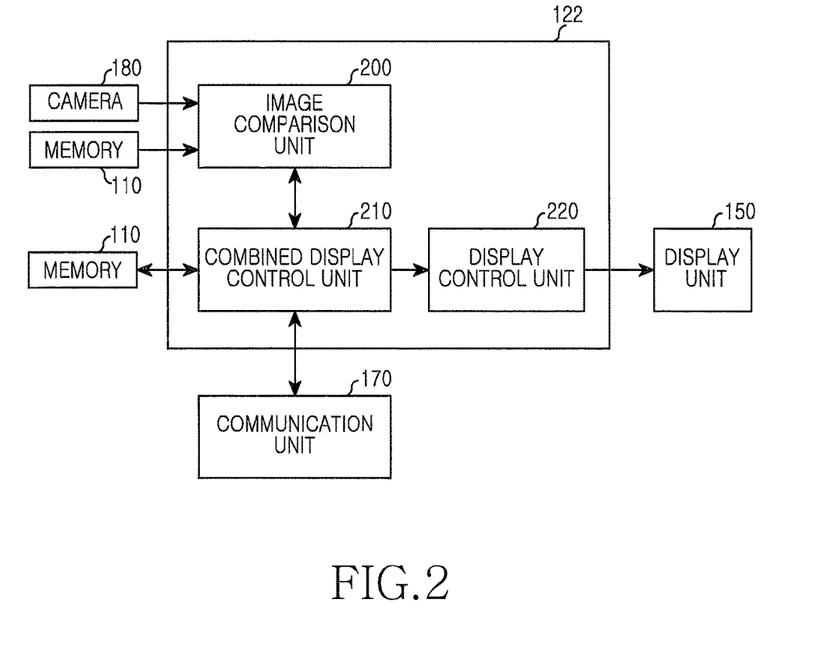
FIG. 2 illustrates a detailed block configuration of a processor according to embodiments of the present disclosure.

The processor 122 enables the electronic device 100 to provide various services by using at least one software program. In this case, the processor 122 controls to execute at least one program stored in the memory 110 and provide a service according to the program. For example, the processor 122 can be configured as illustrated in FIG. 2 in order to execute the combined display control program 115 to configure a combined display of the electronic device and the sub-electronic device. As another example, the processor 122 can be configured as illustrated in FIG. 2 in order to execute the image comparison program 114 to compare an image on the electronic device with an image on the sub-electronic device.

The audio processing unit 130 provides an audio interface between a user and the electronic device 100 through a speaker 131 and a microphone 132.

The input/output control unit 140 provides an interface between an input/output device including the display unit 150 and the input unit 160 and the peripheral interface 123.

The display unit 150 displays the state information of the electronic device 100, characters input by the user, moving pictures, and still pictures. For example, the display unit 150 displays information about application programs executed by the processor 122. As another example, the display unit 150 displays a menu for setting the position of the electronic device for combined display configuration which is provided from the combined display control program 115 according to the control of the GUI program 113.

The input unit 160 provides input data generated by the selection of the user to the processor unit 120 through the input/output control unit 140. In this case, the input unit 160 includes a keypad including at least one hardware button, a touch pad for detecting touch information, and the like. For example, the input unit 160 provides touch information detected through the touch pad to the processor 122 through the input/output control unit 140. In addition, the input unit 160 provides a connection with an USB device.

The communication unit 170 includes at least one software component for performing communication functions for voice communication and data communication. In this case, the communication unit 140 can be classified into a plurality of communication sub-modules which support different communication networks. For example, the communication networks can include, but not be limited to, a Global System for Mobile communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a wireless LAN, a Bluetooth network, and a Near Field Communication (NFC) network.

FIG. 2 illustrates a detailed block configuration of a processor according to various embodiments of the present disclosure.

As illustrated in FIG. 2, the processor 122 includes an image comparison unit 200, a combined display control unit 210, and a display control unit 220.

The image comparison unit 200 executes the image comparison program 114 to compare an image on an electronic device with an image on a sub-electronic device. For example, the image comparison unit 200 identifies whether the sub-electronic device is located at the upper, lower, left or right side of the electronic device through image comparison. For example, the image comparison unit 200 identifies the relative position information of the sub-electronic device 611 with respect to the electronic device 601 by comparing a left space 641 of a subject 621 in an image 625 acquired by the electronic device 601 with a left space 651 of the subject 621 in an image received from the sub-electronic device 611 as illustrated in FIG. 6C. For example, the image comparison unit 200 identifies that the sub-electronic device 611 is located on the right side of the electronic device 601 through the image comparison. FIG. 6D illustrates a case where an image acquired by a camera in the electronic device 601 and an image acquired by a camera in the sub-electronic device 611 are reversed left to right.

The combined display control unit 210 executes the combined display control program 115 of the program storage unit 111 to configure a combined display of the electronic device and the sub-electronic device. For example, the combined display control unit 210 determines whether a menu for configuring a combined display in cooperation with at least one sub-electronic device connected to the electronic device through near wireless communication is selected. In this case, the combined display control unit 210 selects at least one sub-electronic device for combined display configuration. When an event for combined display configuration occurs, the combined display control unit 210 determines whether to set a position for combined display configuration as illustrated in FIG. 6A by reference element 603. When the position for combined display configuration is set (as referenced by the OK button 605), the combined display control unit 210 acquires an image by driving the camera 609 of the electronic device 601 to capture a subject 621 as illustrated in FIG. 6B. At the same time, the combined display control unit 210 requests the sub-electronic device 611 to transmit an image. For example, the combined display control program 115 requests the sub-electronic device 611 to determine whether to set a position for combined display configuration (as illustrated by reference element 613 in FIG. 6A). When the position for combined display configuration is set, the combined display control unit 210 requests the sub-electronic device 611 to transmit an image acquired by capturing the subject 621 through the camera 619 of the sub-electronic device 611. In this case, the combined display control unit 210 controls to capture an image at the same time as the time of the capturing by the sub-electronic device 611 by using a timer. In this case, the combined display control unit 210 requests the sub-electronic device 611 to transmit an image captured at the same time as the time of the capturing by the electronic device 611. For example, the combined display control unit 210 identifies whether the sub-electronic device is located on the upper, lower, left or right side of the electronic device through image comparison by the image comparison unit 200. Thereafter, the combined display control unit 210 controls to transmit display data to the sub-electronic device by using the relative position information. In this case, a near field wireless communication interface through which the electronic device transmits display data to the sub-electronic device can be identical to or different from a near field wireless communication interface through which the electronic device is connected to the sub-electronic device.

The display control unit 220 executes the GUI program 113 of the program storage unit 111 to provide a graphic user interface on the display unit 150. For example, the display control unit 220 controls to display information about an application program executed by the processor 122 on the display unit 150. As another example, the display control unit 220 enables the combined display control unit 210 to display a menu for setting a position of the electronic device for combined display configuration on the display unit 150.

In addition, the electronic device includes a separate module including at least one of the image comparison unit 200 and the combined display control unit 210.

Figure 3:
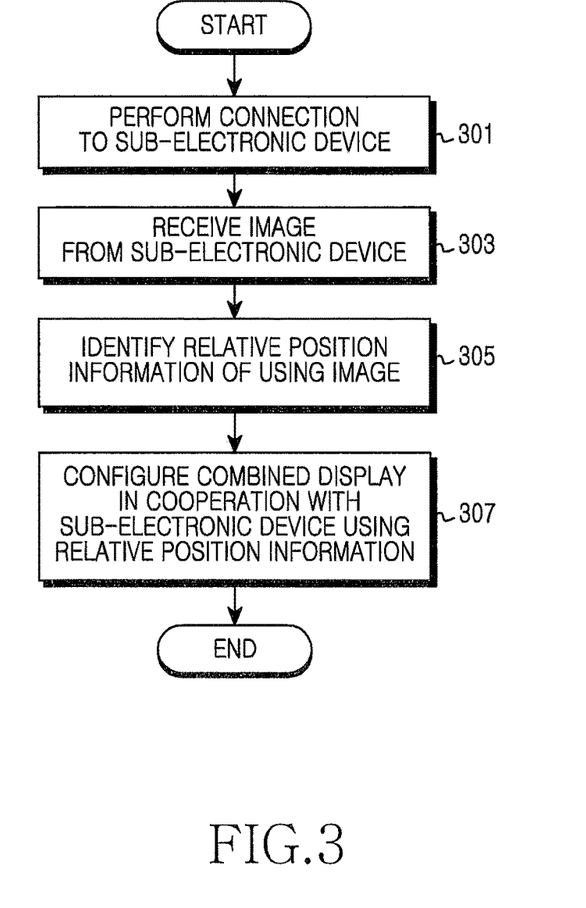
FIGS. 3 to 5 illustrate processes for configuring a combined display in cooperation with a sub-electronic device in an electronic device according to various embodiments of the present disclosure.
Figure 4:
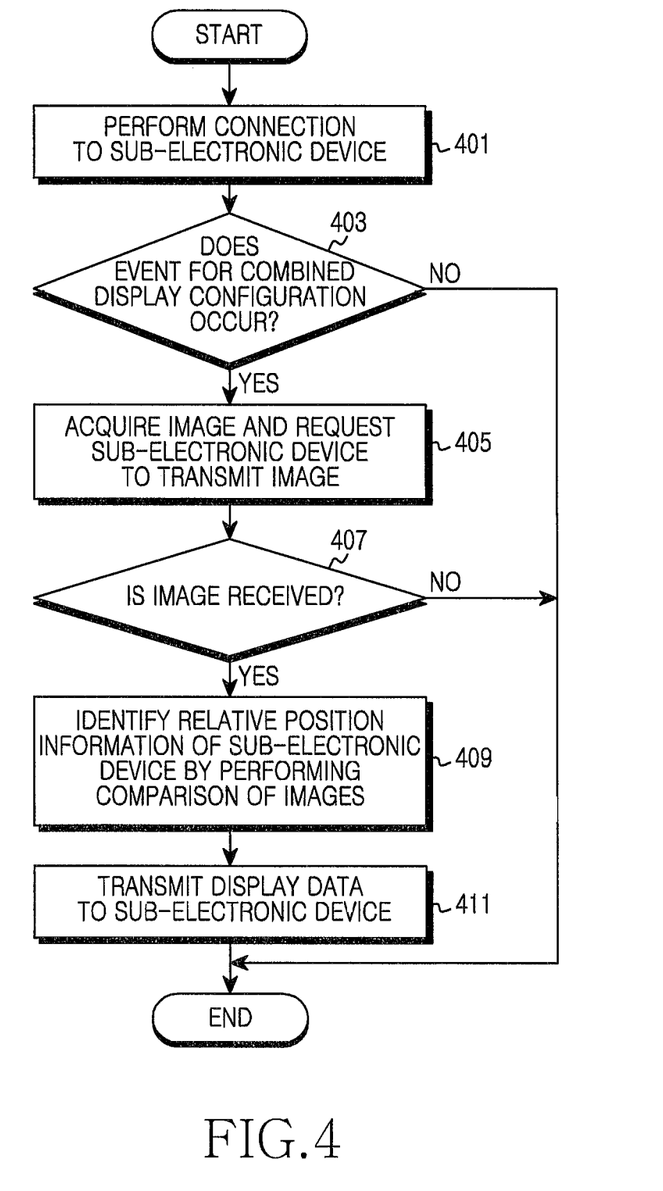
Figure 5:
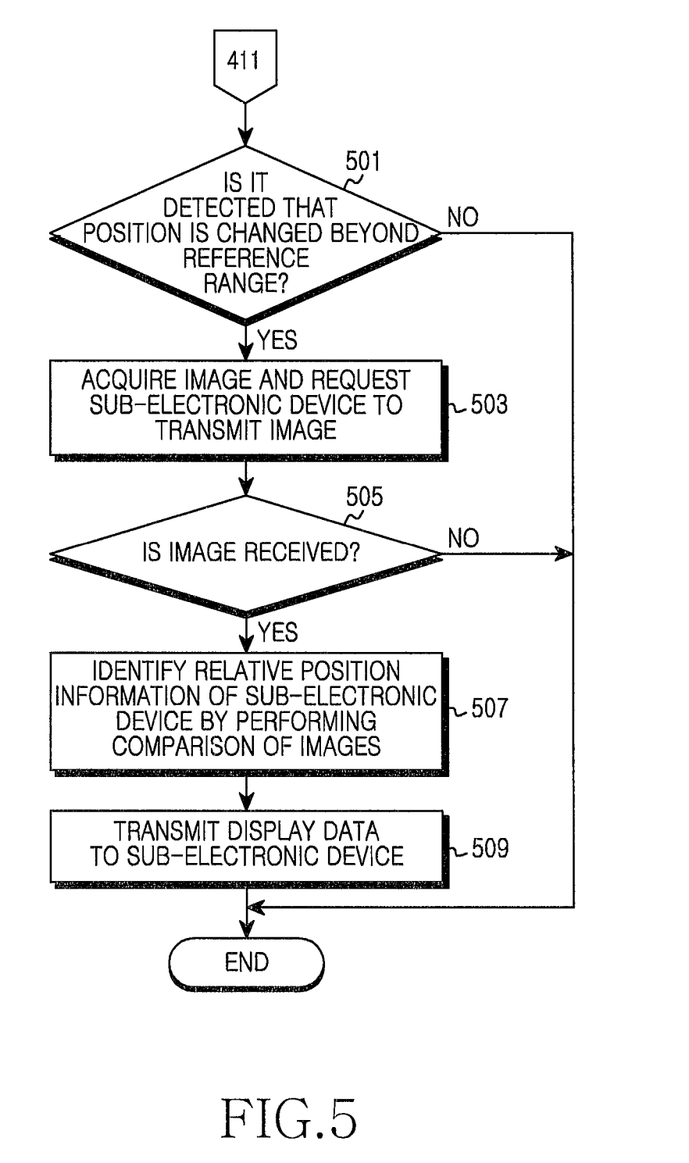

FIGS. 3 to 5 illustrate processes for configuring a combined display in cooperation with a sub-electronic device in an electronic device according to various embodiments of the present disclosure.

Referring to FIG. 3, in block 301, the electronic device establishes a connection to the sub-electronic device. For example, the electronic device establishes a connection to the sub-electronic device by using at least one near field wireless communication. Herein, the near filed wireless communication includes at least one communication interface of Bluetooth, wireless LAN, and NFC.

In block 303, the electronic device receives an image from the sub-electronic device. For example, the electronic device identifies whether a menu for configuring a combined display in cooperation with at least one sub-electronic device connected to the electronic device through near-field wireless communication is selected. In this case, the electronic device selects at least one sub-electronic device for the combined display configuration. When an event for configuring a combined display occurs, the electronic device 601 identify whether the electronic device 601 is located at a position for combined display configuration as illustrated in FIG. 6A. When the position for combined display configuration is determined (as referenced by the OK button 605), the electronic device 601 drives a camera 609 of the electronic device 601 and acquire an image by capturing a subject 621 as illustrated in FIG. 6B. At the same time, the electronic device 601 requests image transmission from the sub-electronic device 611. For example, the electronic device 601 requests the sub-electronic device 611 to determine whether to set a position for combined display configuration. When the position for combined display configuration is set, the electronic device 601 requests the sub-electronic device 611 to transmit an image acquired by capturing the subject 621 through the camera 619 of the sub-electronic device 611. In this case, the electronic device 601 controls to capture an image at the same time as the time of the capturing by the sub-electronic device 611 by using a timer. In this case, the electronic device 601 requests the sub-electronic device 611 to transmit an image captured at the same time as the time of the capturing by the electronic device 611.

In block 305, the electronic device identifies relative position information of the sub-electronic device by using images. For example, the electronic device identifies whether the sub-electronic device is located on the upper, lower, left or right side of the electronic device through image comparison. For example, the electronic device 601 identifies the relative position information of the sub-electronic device 611 with respect to the electronic device 601 by comparing a left space 641 of a subject 621 in an image 625 acquired by the electronic device 601 with a left space 651 of the subject 621 in an image received from the sub-electronic device 611 as illustrated in FIG. 6C. For example, the electronic device 601 identifies that the sub-electronic device 611 is located on the right side of the electronic device 601 through the image comparison. In this case, FIG. 6D illustrates a case where an image acquired by a camera in the electronic device 601 and an image acquired by a camera in the sub-electronic device 611 are reversed left to right.

Figure 6E:
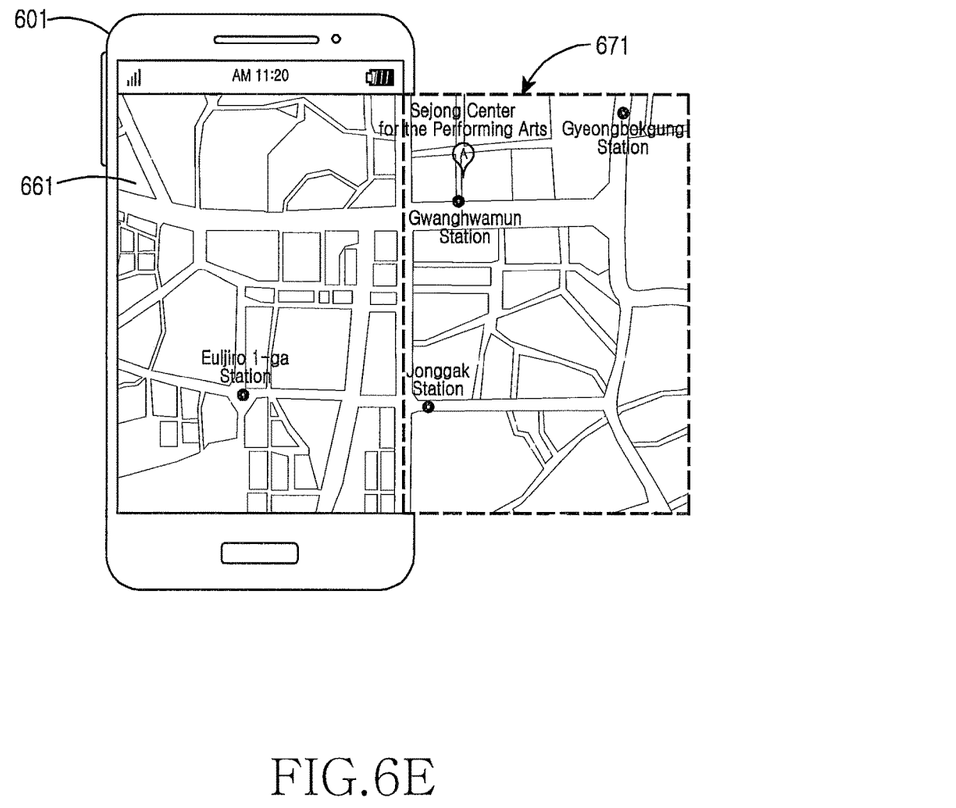
Figure 6F:
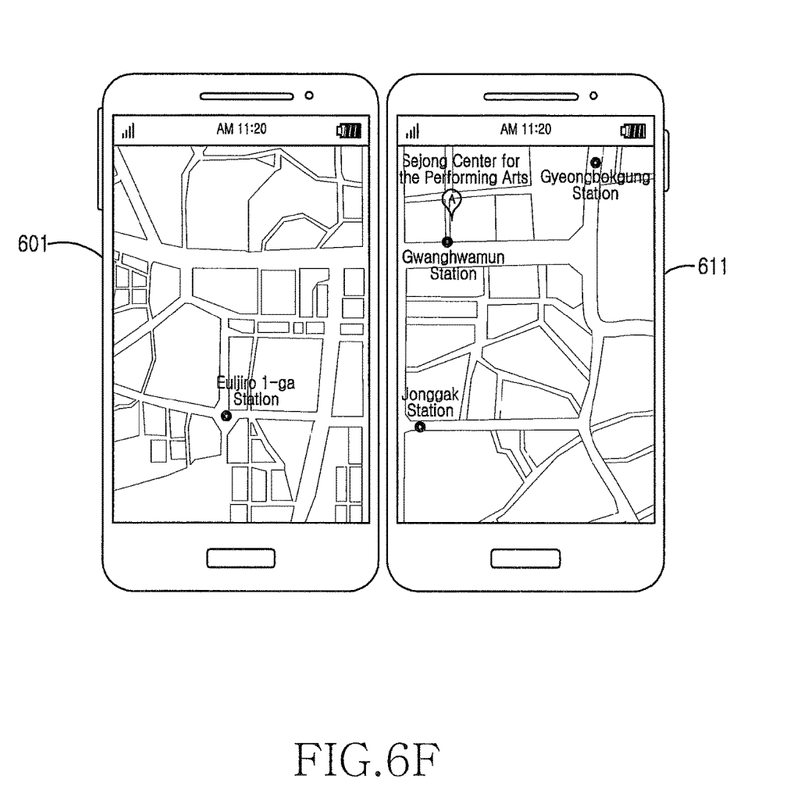

In block 307, the electronic device configures a combined display in cooperation with the sub-electronic device by using the relative position information of the sub-electronic device. For example, when the electronic device 601 displays a map (661) as illustrated in FIG. 6E, the electronic device 601 determines the size of display data to be transmitted to the sub-electronic device 611 by using display information of the sub-electronic device 611. Herein, the display information of the sub-electronic device 611 can be acquired when the electronic device 601 connects to the sub-electronic device 611, when an event for combined display configuration in cooperation with the sub-electronic device 611, or when the electronic device 601 requests the sub-electronic device 611 to transmit an image. Thereafter, the electronic device 601 transmits map data 671 to the sub-electronic device 611 through near field wireless communication as illustrated in FIG. 6F. In this case, a near field wireless communication interface through which the electronic device transmits display data to the sub-electronic device can be identical to or different from a near field wireless communication interface through which the electronic device is connected to the sub-electronic device.

Thereafter, the electronic device ends the algorithm.

Referring to FIG. 4, in block 401, the electronic device connects to the sub-electronic device. For example, the electronic device connects to the sub-electronic device by using at least one near field wireless communication. Herein, the near field wireless communication includes at least one communication interface of Bluetooth, wireless local area network (LAN), and near field communication (NFC).

After connecting to the sub-electronic device, in block 403, the electronic device determines whether an event for combined display configuration occurs. For example, the electronic device determines whether a menu for configuring a combined display in cooperation with at least one sub-electronic device connected to the electronic device through near wireless communication is selected. In this case, the electronic device selects at least one sub-electronic device for the combined display configuration. If the combined display configuration event does not occur, the electronic device ends the algorithm.

When the combined display configuration event occurs, in block 405, the electronic device acquires an image and request the sub-electronic device to transmit an image. For example, when an event for combined display configuration occurs, the electronic device 601 determines whether to set a position for combined display configuration (603) as illustrated in FIG. 6A. When the position for combined display configuration is set (605), the electronic device 210 acquires an image by driving the camera 609 of the electronic device 601 to capture the subject 621 as illustrated in FIG. 6B. At the same time, the electronic 601 requests the sub-electronic device 611 to transmit an image. For example, the electronic device 601 requests the sub-electronic device 611 to determine whether to set a position for combined display configuration. When the position for combined display configuration is set, the electronic device 601 requests the sub-electronic device 611 to transmit an image acquired by capturing the subject 621 through the camera 619 of the sub-electronic device 611. In this case, the electronic device 601 controls to capture an image at the same time as the time of the capturing by the sub-electronic device 611 by using a timer. In this case, the electronic device 601 requests the sub-electronic device 611 to transmit an image captured at the same time as the time of the capturing by the electronic device 611.

After acquiring the image and requesting the sub-electronic device to transmit the image, the electronic device determines whether the image is received from the sub-electronic device in block 407. If the image is not received, the electronic device ends the algorithm.

When the image is received, the electronic device identifies the relative position information of the sub-electronic device by comparing the images in operation 409. For example, the electronic device identifies whether the sub-electronic device is located on the upper, lower, left or right side of the electronic device through image comparison. For example, the electronic device 601 identifies the relative position information of the sub-electronic device 611 with respect to the electronic device 601 by comparing a left space 641 of a subject 621 in an image 625 acquired by the electronic device 601 with a left space 651 of the subject 621 in an image received from the sub-electronic device 611 as illustrated in FIG. 6C. For example, the electronic device 601 identifies that the sub-electronic device 611 is located on the right side of the electronic device 601 through the image comparison. In this case, FIG. 6D illustrates a case where an image acquired by a camera in the electronic device 601 and an image acquired by a camera in the sub-electronic device 611 are reversed left to right.

In block 411, the electronic device transmits display data to the sub-electronic device. For example, when the electronic device 601 displays a map (661) as illustrated in FIG. 6E, the electronic device 601 determines the size of display data to be transmitted to the sub-electronic device 611 by using display information of the sub-electronic device 611. Herein, the display information of the sub-electronic device 611 be acquired when the electronic device 601 connects to the sub-electronic device 611, when an event for combined display configuration in cooperation with the sub-electronic device 611, or when the electronic device 601 requests the sub-electronic device 611 to transmit an image. Thereafter, the electronic device 601 transmits the map data 671 to the sub-electronic device 611 through near field wireless communication as illustrated in FIG. 6F. In this case, a near field wireless communication interface through which the electronic device transmits display data to the sub-electronic device can be identical to or different from a near field wireless communication interface through which the electronic device is connected to the sub-electronic device.

Thereafter, the electronic device ends the algorithm.

Referring to FIG. 5, in block 501, the electronic device detects whether a position is changed beyond a reference range. For example, as illustrated in FIG. 6F, the electronic device 601 identifies whether the position is changed beyond the reference range during transmission (operation 411) of the display data to the sub-electronic device 611. When it is detected that the position is not changed beyond the reference range, the electronic device ends the algorithm.

When it is detected that the position is changed beyond the reference range, the electronic device acquires an image and request the sub-electronic device to transmit an image in operation 503. That is, when it is detected that the position is changed beyond the reference range, the electronic device recognizes that the position information of a counterpart electronic device has been updated with respect to the electronic device. For example, when an event for combined display configuration occurs, the electronic device 601 determines whether to set a position for combined display configuration as illustrated in FIG. 6A by reference element 603. When the position for combined display configuration is set (as referenced by the OK button 605), the electronic device 210 acquires an image by driving the camera 609 of the electronic device 601 to capture the subject 621 as illustrated in FIG. 6B. At the same time, the electronic device 601 requests the sub-electronic device 611 to transmit an image. For example, the electronic device 601 requests the sub-electronic device 611 to determine whether to set a position for combined display configuration. When the position for combined display configuration is set, the electronic device 601 requests the sub-electronic device 611 to transmit an image acquired by capturing the subject 621 through the camera 619 of the sub-electronic device 611. In this case, the electronic device 601 controls to capture an image at the same time as the time of the capturing by the sub-electronic device 611 by using a timer. In this case, the electronic device 601 requests the sub-electronic device 611 to transmit an image captured at the same time as the time of the capturing by the electronic device 611.

After acquiring the image and requesting the sub-electronic device to transmit the image, the electronic device determines whether the image is received from the sub-electronic device in operation 505. If the image is not received, the electronic device ends the algorithm.

When the image is received, the electronic device identifies the relative position information of the sub-electronic device by comparing the images in operation 507. For example, the electronic device identifies whether the sub-electronic device is located on the upper, lower, left or right side of the electronic device through image comparison. For example, the electronic device 601 identifies the relative position information of the sub-electronic device 611 with respect to the electronic device 601 by comparing a left space 641 of a subject 621 in an image 625 acquired by the electronic device 601 with a left space 651 of the subject 621 in an image received from the sub-electronic device 611 as illustrated in FIG. 6C. For example, the electronic device 601 identifies that the sub-electronic device 611 is located on the right side of the electronic device 601 through the image comparison. In this case, FIG. 6D illustrates a case where an image acquired by a camera in the electronic device 601 and an image acquired by a camera in the sub-electronic device 611 are reversed left to right.

In operation 509, the electronic device transmits display data to the sub-electronic device. For example, when the electronic device 601 displays a map (661) as illustrated in FIG. 6E, the electronic device 601 determines the size of display data to be transmitted to the sub-electronic device 611 by using display information of the sub-electronic device 611. Herein, the display information of the sub-electronic device 611 can be acquired when the electronic device 601 connects to the sub-electronic device 611, when an event for combined display configuration in cooperation with the sub-electronic device 611, or when the electronic device 601 requests the sub-electronic device 611 to transmit an image. Thereafter, the electronic device 601 transmits the map data 671 to the sub-electronic device 611 through near field wireless communication as illustrated in FIG. 6F. In this case, a near field wireless communication interface through which the electronic device transmits display data to the sub-electronic device can be identical to or different from a near field wireless communication interface through which the electronic device is connected to the sub-electronic device.

Thereafter, the electronic device ends the algorithm.

As described above, when the electronic device configures the combined display in cooperation with at least one sub-electronic device, the electronic device identifies the relative position information of the sub-electronic device with respect to the electronic device through comparison with an acquired image by using respective cameras, thereby allowing the electronic device to easily configure the combined display.

It will be appreciated that embodiments of the present disclosure according to the claims and description in the specification can be realized in the form of hardware, software or a combination of hardware and software. Any such software can be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software can be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs can be conveyed electronically via any medium such as a communication signal carried over a wired or wireless connection and embodiments suitably encompass the same.

While the present disclosure has been shown and described with reference to certain embodiments thereof, it will be understood by those skilled in the art that various changes in form and details may be made therein without departing from the spirit and scope of present disclosure as defined by the appended claims. Therefore, the scope of present disclosure is defined not by the detailed description of the present disclosure but by the appended claims, and all differences within the scope will be construed as being included in present disclosure.

What is claimed is:

1. A method in an electronic device, comprising:
  acquiring a first image including a subject;
  receiving a second image including the subject from another electronic device, wherein the second image is acquired by the another electronic device;
  identifying relative location information of the another electronic device with respect to the electronic device based on a location of the subject in the first image and a location of the subject in the second image;
  generating, based on the relative location information, an integrated image including a first partial image to be displayed in the electronic device and a second partial image to be displayed in the another electronic device;
  detecting that a position of the another electronic device is changed beyond a reference range while data for the second partial image is transmitted to the another electronic device;
  updating, based on the location of the subject in the first image and a location of the subject in a third image which is received from the another electronic device, the relative location information of the another electronic device; and
  generating, based on the updated relative location information, another integrated image including a third partial image to be displayed in the electronic device and a fourth partial image to be displayed in the another electronic device.

2. The method of claim 1, further comprising:
  connecting to the another electronic device by using at least one near field wireless communication of Bluetooth, wireless local area network (LAN), and near field communication (NFC).

3. The method of claim 2, wherein:
  connecting to the another electronic device comprises receiving display information of the another electronic device; and
  wherein the display information is resolution.

4. The method of claim 1, wherein:
  receiving the second image from the another electronic device comprises receiving display information of the another electronic device, and
  wherein the display information is resolution.

5. The method of claim 1, wherein identifying the relative location information of the another electronic device comprises identifying whether the another electronic device is located on upper, lower, left or right side of the electronic device by comparing the location of the subject in the first image and the location of the subject in the second image.

6. The method of claim 1, further comprising:
  transmitting data for the second partial image to the another electronic device by using the relative location information.

7. An electronic device comprising:
  at least one processor;
  at least one memory; and
  at least one program stored in the memory and configured to be executable by the processor,
  wherein the processor is configured to:
    acquire a first image including a subject;
    receive a second image including the subject from another electronic device, wherein the second image is acquired;
    identify relative location information of the another electronic device with respect to the electronic device based on a location of the subject in the first image and a location of the subject in the second image;
    generate, based on the relative location information, an integrated image including a first partial image to be displayed in the electronic device and a second partial image to be displayed in the another electronic device;
    detect that a position of the another electronic device is changed beyond a reference range while data for the second partial image is transmitted to the another electronic device;
    update, based on the location of the subject in the first image and a location of the subject in a third image which is received from the another electronic device, the relative location information of the another electronic device; and
    generate, based on the updated relative location information, another integrated image including a third partial image to be displayed in the electronic device and a fourth partial image to be displayed in the another electronic device.

8. The electronic device of claim 7, wherein the processor is further configured to connect to the another electronic device by using at least one near field wireless communication of Bluetooth, wireless local area network (LAN), and near field communication (NFC).

9. The electronic device of claim 8, wherein the processor is further configured to receive display information of the another electronic device when connecting to the at least one another electronic device, and wherein the display information is resolution.

10. The electronic device of claim 7, wherein the processor is further configured to:

receive display information of the another electronic device when the second image is received from the another electronic device; and wherein the display information is resolution.

11. The electronic device of claim 7, wherein the processor is further configured to identify whether the another electronic device is located on upper, lower, left or right side of the electronic device by comparing the location of the subject in the first image and the location of the subject in the second image.

12. The electronic device of claim 7, wherein the processor is further configured to transmit data for the second partial image to the another electronic device by using the relative location information.

* * * * *